(12) United States Patent
Kruglick

(10) Patent No.: US 9,058,687 B2
(45) Date of Patent: Jun. 16, 2015

(54) TWO-DIMENSIONAL IMAGE CAPTURE FOR AN AUGMENTED REALITY REPRESENTATION

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 563 days.

(21) Appl. No.: 13/319,500

(22) PCT Filed: Jun. 8, 2011

(86) PCT No.: PCT/US2011/039639
§ 371 (c)(1),
(2), (4) Date: Nov. 8, 2011

(87) PCT Pub. No.: WO2012/170023
PCT Pub. Date: Dec. 13, 2012

(65) Prior Publication Data
US 2012/0314096 A1  Dec. 13, 2012

(51) Int. Cl.
G09G 5/00 (2006.01)
G06T 19/00 (2011.01)
G06T 11/00 (2006.01)
G06T 7/00 (2006.01)

(52) U.S. Cl.
CPC ............... *G06T 19/006* (2013.01); *G06T 11/00* (2013.01); *G06T 7/0065* (2013.01); *G06T 2200/24* (2013.01); *G06T 2207/10016* (2013.01)

(58) Field of Classification Search
CPC ....... G06T 19/006; G06T 19/00; G06F 3/011; G06F 3/012; G06F 3/0304
USPC .................................... 345/629–633; 715/757
See application file for complete search history.

(56) References Cited

U.S. PATENT DOCUMENTS

| | | | |
|---|---|---|---|
| 6,668,082 B1 * | 12/2003 | Davison et al. | 382/190 |
| 2006/0008119 A1 * | 1/2006 | Chang et al. | 382/103 |
| 2008/0232645 A1 | 9/2008 | Billinghurst et al. | |
| 2009/0102859 A1 | 4/2009 | Athsani et al. | |
| 2010/0045701 A1 | 2/2010 | Scott et al. | |
| 2010/0232727 A1 * | 9/2010 | Engedal | 382/285 |
| 2010/0259537 A1 * | 10/2010 | Ben-Himane et al. | 345/419 |
| 2011/0018903 A1 | 1/2011 | Lapstun et al. | |
| 2011/0153310 A1 * | 6/2011 | Ehlen et al. | 704/9 |
| 2011/0194731 A1 * | 8/2011 | Benhimane et al. | 382/103 |
| 2012/0019533 A1 * | 1/2012 | Tabellion | 345/423 |

FOREIGN PATENT DOCUMENTS

JP    2008-065807    3/2008

OTHER PUBLICATIONS

Shingu, Jun et al.; Camera Pose Navigation using Augmented Reality; Oct. 13-16, 2010; Mixed and Augmented Reality (ISMAR), 2010 9th IEEE International Symposium; pp. 271-272.*

Ventura, Jonathan et al.; Real-time Planar World Modeling for Augmented Reality; 2010; Department of Computer Science; University of California, Santa Barbara.*

United States Patent and Trademark Office, International Search Report and Written Opinion of the International Searching Authority for PCT/US2011/039639, mailed on Sep. 27, 2011.

(Continued)

*Primary Examiner* — Todd Buttram

(57) ABSTRACT

Technologies and implementations for capturing two-dimensional images for an augmented reality representation are generally disclosed.

20 Claims, 11 Drawing Sheets

(56) References Cited

OTHER PUBLICATIONS

Gupta, Paritosh, et al., Video scene categorization by 3D hierarchical histogram matching, 2009 IEEE 12th International Conference on Computer Vision, Sep. 29, 2009-Oct. 2, 2009, pp. 1655-1662, Kyoto, Japan.
Microsoft Photosynth, What is photosynth?, accessed online via http://photosynth.net/about.aspx on Nov. 8, 2011.
Debevec, Paul, et al., Facade: Modeling and rendering architecture from photographs, 1997, accessed online via http://ict.debevec.org/~debevec/Research/ on Nov. 8, 2011.
Photo-to-3D.com, 3D models created from photos, accessed online via http://www.photo-to-3d.com on Nov. 8, 2011.
Canoma: Quickly create realistic 3D models from photographs, Mar. 22, 2004, accessed online via http://www.canoma.com/ on Nov. 8, 2011.
North, Alison J., Seeing is believing? A beginners' guide to practical pitfalls in image acquisition, Jan. 3, 2006, Journal of Cell Biology, Jan. 3, 2006, vol. 172, No. 1, pp. 9-18, the Rockefeller University Press, accessed online via http://jcb.rupress.org/content/172/1/9.full on Nov. 8, 2011.
Wang, Zhou, et al., Image quality assessment: from error visibility to structural similarity, IEE Transactions on Image Processing, 2004, vol. 13, No. 4, pp. 600-612, IEEE.
Ong, E., et al., A no-reference quality metric for measuring image blur, Proceedings of the Seventh International Symposium on Signal Processing and Its Applications, 2003, vol. 1, pp. 469-472, IEEE.
Kusuma, T.M. and H.J. Zepernick, A reduced-reference perceptual quality metric for in-service image quality assessment, Joint First Workshop on Mobile Future and Symposium on Trends in Communications, SympoTIC '03, Oct. 2003, pp. 71-74.
Wang, Zhou and Alan C. Bovik, A universal image quality index, IEEE Signal Processing Letters, Mar. 2002, vol. 9, No. 3, pp. 81-84, IEEE.
"Creating a 3D Model," accessed at http://web.archive.org/web/20061108120750/http://www.canoma.com/chapter3.pdf, Canoma Tutorial, Chapter 3, accessed on Sep. 22, 2014, pp. 30-54.
"Punchcard: VideoTrace," accessed at http://web.archive.org/web/20110410123207/http://punchcard.com.au/wordpress/?p=12, accessed on Sep. 22, 2014, pp. 1-2.
Fischler, M. A., and Bolles, R. C. "Random sample consensus: A paradigm for model fitting with applications to image analysis and automated cartography," Magazine Communs. of the ACM, vol. 24, No. 6, pp. 381-395 (1981).
Liu, L., and Stamos I., "A systematic approach for 2D-image to 3D-range registration in urban environments," IEEE IEEE 11th International Conference on Computer Vision, 2007, ICCV 2007, pp. 1-8 (2007).
Quirk, P., et al., "RANSAC-Assisted Display Model Reconstruction for Projective Display," Virtual Reality Conference, pp. 8 (2006).
Simple Interactive 3D learning for all, YouTube video, retreived from http://www.youtube.com/watch?v=YEM-XAeY4K0, uploaded on Jun. 17, 2008, Google Tech Talks.

* cited by examiner

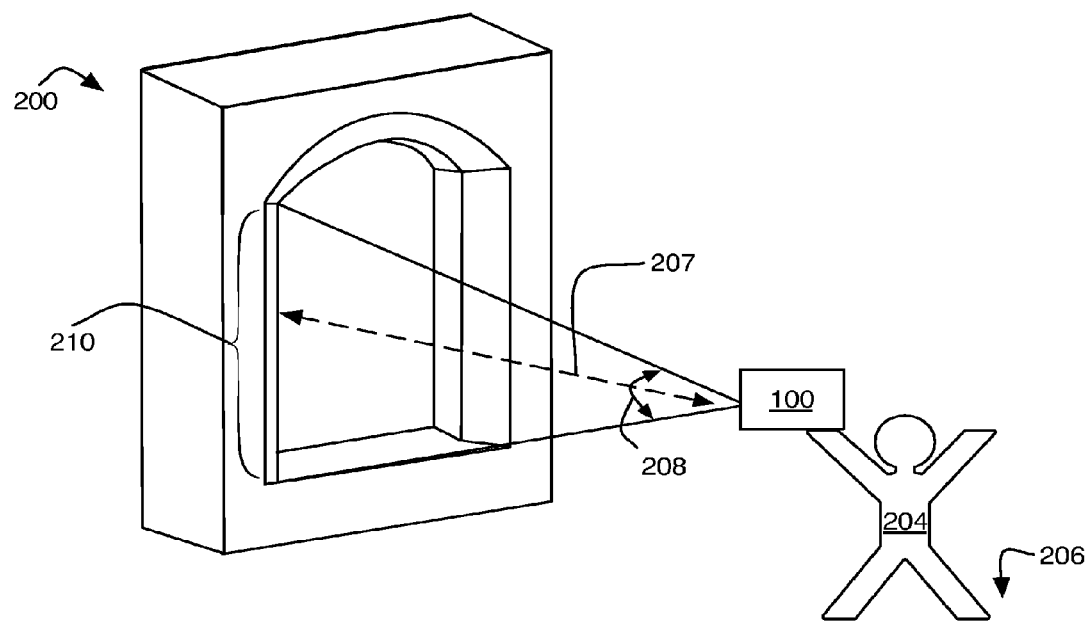
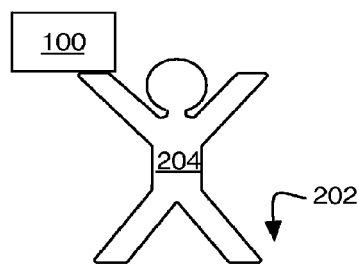
FIG. 2

1000 A computer program product.

1002 A signal bearing medium.

1004 Machine-readable instructions, which, if executed by one or more processors, operatively enable a computing device to:

determine an augmented reality representation of an object based at least in part on an analysis of one or more two-dimensional images of the object, wherein the augmented reality representation includes a plurality of surface hypotheses;

determine one or more confidence values associated with individual surface hypotheses;

compare of the one or more confidence values with one or more threshold confidence criteria to identify one or more surface areas of interest from the plurality of surface hypotheses; and/or determine guidance regarding capturing one or more additional two-dimensional images of the object via a display of the electronic image capturing device, wherein the guidance is based at least in part on the identified surface areas of interest.

1006 a computer-readable medium.

1008 a recordable medium.

1010 a communications medium.

FIG. 10

TWO-DIMENSIONAL IMAGE CAPTURE FOR AN AUGMENTED REALITY REPRESENTATION

CROSS-REFERENCE TO RELATED APPLICATIONS

This application is a national stage filing under 35 U.S.C. §371 of PCT Application No. PCT/US2011/39639, filed on Jun. 8, 2011.

BACKGROUND

Unless otherwise indicated herein, the approaches described in this section are not prior art to the claims in this application and are not admitted to be prior art by inclusion in this section.

Some image processing services may merge several images into a virtual tour. Such virtual tours may attempt to simulate as much of a three-dimensional (3D) an experience as possible. Meanwhile other systems may convert a series of two-dimensional (2D) images to 3D.

The quality of the 3D model or synthesis produced may depend on the positioning and resolution of photos. When using photo-to-3D conversion, for example, it is possible to wind up with some combination of missing surfaces and/or images that lack enough shared context or edges to allow the integration of a photo into such a 3D model.

As augmented reality representations (e.g., 3D images) may be used for more and more purposes, average home users may want to be able to take photos of objects and places and generate good quality 3D models of them.

SUMMARY

Some example methods, apparatus, and systems described herein may relate to capturing two-dimensional images for an augmented reality representation.

Some example methods, apparatus, and systems related to capturing two-dimensional images for an augmented reality representation may be implemented in an electronic image capturing device. Such methods may include determining, by an electronic image capturing device, an augmented reality representation of an object based at least in part on an analysis of one or more two-dimensional images of the object. Such an augmented reality representation may include a plurality of surface hypotheses. One or more reliability values associated with individual surface hypotheses may be determined. The one or more reliability values may be compared with one or more threshold reliability criteria to identify one or more surface areas of interest from the plurality of surface hypotheses. Guidance regarding capturing one or more additional two-dimensional images of the object may be displayed via a display of the electronic image capturing device. Such guidance may be based at least in part on the identified surface areas of interest.

Some example methods, apparatus, and systems related to capturing two-dimensional images for an augmented reality representation might be implemented in an electronic image capturing device. Such an electronic image capturing device may include an optical sensor and a control unit. Such an optical sensor may be configured to capture two-dimensional images of an object and capture real-time video data. Such a control unit may be configured to determine an augmented reality representation of the object based at least in part on an analysis of one or more two-dimensional images of the object. Such an augmented reality representation may include a plurality of surface hypotheses. One or more reliability values associated with individual surface hypotheses may be determined by the control unit. The one or more reliability values may be compared with one or more threshold reliability criteria to identify one or more surface areas of interest from the plurality of surface hypotheses. Guidance may be determined regarding capturing one or more additional two-dimensional images of the object via a display of the electronic image capturing device. Such guidance may be based at least in part on the identified surface areas of interest.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 2 illustrates an example electronic image capturing device capturing one or more two-dimensional images of an object that is arranged in accordance with at least some embodiments of the present disclosure;

FIG. 10 is an illustration of an example computer program product that is arranged in accordance with at least some embodiments of the present disclosure.

DETAILED DESCRIPTION

Figure 1:
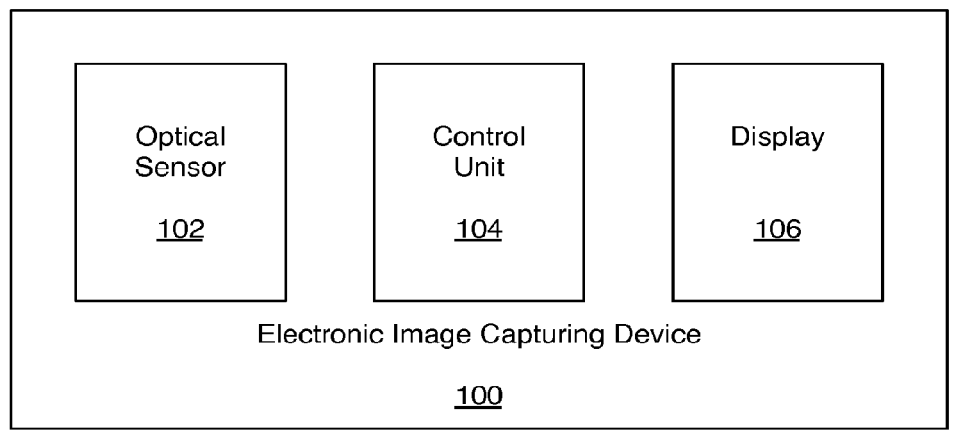
FIG. 1 illustrates an example electronic image capturing device that is arranged in accordance with at least some embodiments of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to capturing two-dimensional images for an augmented reality representation.

Methods, apparatus, and systems are described below for computing advantageous viewpoints for photography in order to build augmented reality representations (e.g., 3D models) and showing those viewpoints to a user on their electronic image capturing device. For example, a smart phone-type electronic image capturing device may display a preferred vantage point showing a target view that is suggested to be photographed by the user. Such a preferred vantage point may have been calculated to provide additional image data for portions of the augmented reality representation that have low quality data or portions of the augmented reality representation that were not directly viewed but have been theorized to exist.

FIG. 1 illustrates an example electronic image capturing device 100 that is arranged in accordance with at least some embodiments of the present disclosure. Electronic image capturing device 100 may be used to perform some or all of the various functions discussed below in connection with FIG. 3 and/or FIG. 4. Electronic image capturing device 100 may include any device or collection of devices capable of undertaking digital image capturing. As used herein the term "electronic image capturing device" may refer to a small-form factor portable electronic device capable of digital image taking such as, for example, a digital camera, a cell phone, a personal data assistant (PDA), a mobile computing pad, a personal media player device, a wireless web-watch device, an application specific device, or the like, and/or combinations thereof.

In the illustrated example, electronic image capturing device 100 may include an optical sensor 102, a control unit 104, and/or a display 106. Such an optical sensor 102 may be configured to capture two-dimensional images of an object (not illustrated) and/or capture real-time video data.

Control unit 104 may be configured to determine an augmented reality representation of such an object captured by optical sensor 102. For example, control unit 104 may be configured to determine an augmented reality representation based at least in part on an analysis of one or more two-dimensional images of the object. As used herein the term "augmented reality representation" may refer to a real-time direct view or an indirect view of a physical, real-world object, such as a three-dimensional image of an object or the like. Guidance regarding capturing one or more additional two-dimensional images of the object may be provided to a user, such as by visual guidance delivered via display 106. Control unit 104 may utilize such additional two-dimensional images of the object to update the augmented reality representation of such an object.

Further, electronic image capturing device 100 may also include additional items such as memory, a processor, network interface logic, etc. that have not been shown in FIG. 1 for the sake of clarity. For example, electronic image capturing device 100 may also include additional items, such as those described with respect to FIG. 10 below. In some examples, display 106 may be housed within electronic image capturing device 100 or display 106 may be an unattached display (e.g., such as a head-up display or secondary display device).

FIG. 2 illustrates electronic image capturing device 100 capturing one or more two-dimensional images of an object 200 that is arranged in accordance with at least some embodiments of the present disclosure. In the illustrated example, electronic image capturing device 100 may capture a two-dimensional image of object 200 taken from a first position 202. Electronic image capturing device 100 may be configured to determine an augmented reality representation based at least in part on an analysis of the two-dimensional image of object 200 taken from first position 202.

Guidance regarding capturing one or more additional two-dimensional images of the object may be provided to a user 204 via electronic image capturing device 100. For example, electronic image capturing device 100 may guide user 204 to capture another two-dimensional image of object 200 taken from a second position 206. Electronic image capturing device 100 may be configured to update the augmented reality representation based at least in part on an analysis of the two-dimensional image of object 200 taken from second position 206.

Figure 3:
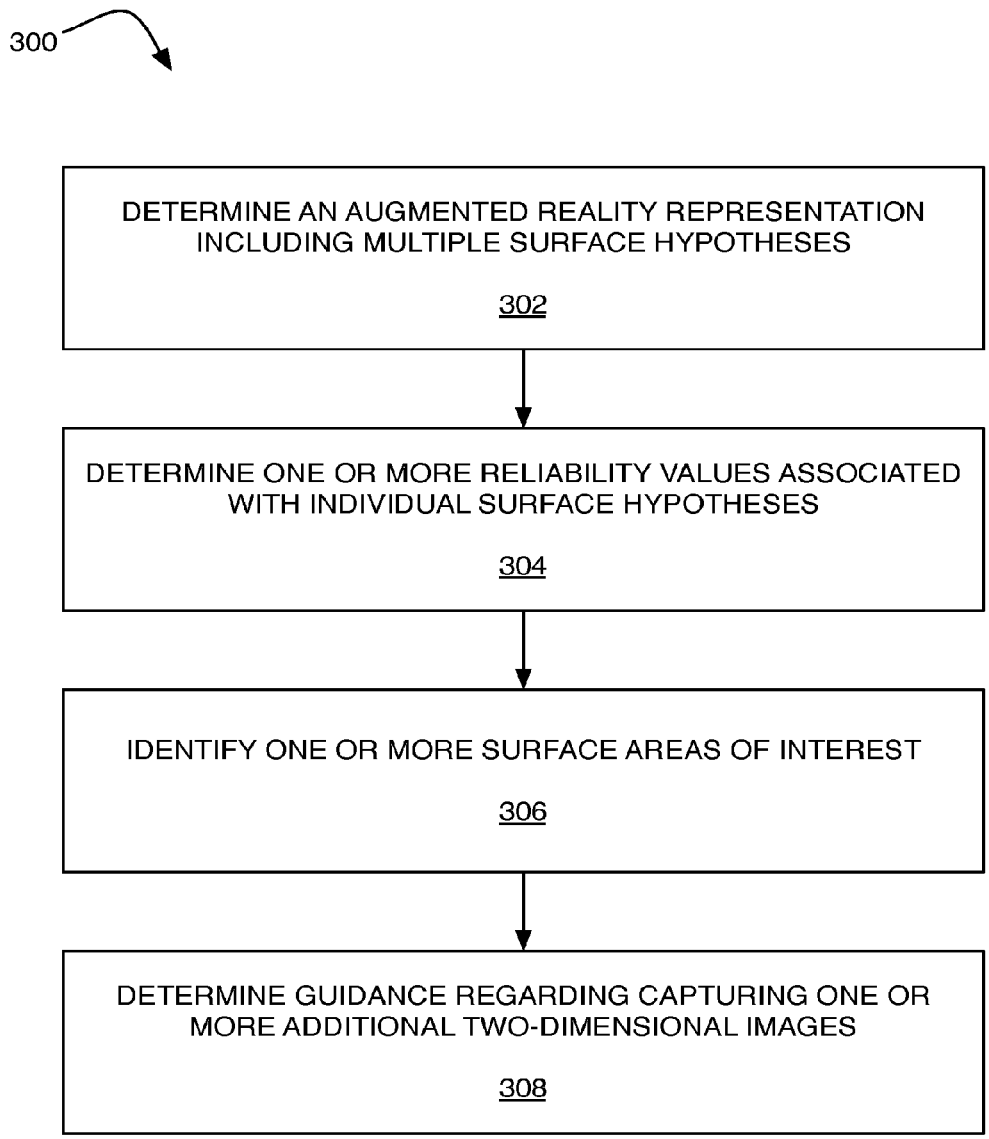
FIG. 3 illustrates an example process for capturing two-dimensional images for an augmented reality representation that is arranged in accordance with at least some embodiments of the present disclosure.

FIG. 3 illustrates an example process 300 for capturing two-dimensional images for an augmented reality representation that is arranged in accordance with at least some embodiments of the present disclosure. In the illustrated example, process 300, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 3 may be practiced in various implementations. For example, although process 300, as shown in FIG. 3, may comprise one particular order of blocks or actions, the order in which these blocks or actions are presented does not necessarily limit claimed subject matter to any particular order. Likewise, intervening actions not shown in FIG. 3 and/or additional actions not shown in FIG. 3 may be employed and/or some of the actions shown in FIG. 3 may be eliminated, without departing from the scope of claimed subject matter. Process 300 may include one or more of functional operations as indicated by example operations 302, 304, 306, and/or 308.

As illustrated, process 300 may be implemented for capturing two-dimensional images for an augmented reality representation that may be implemented in an electronic image capturing device (see, e.g., FIG. 1). In some examples, one or more two-dimensional images of the object may be analyzed to form surface hypotheses for an augmented reality representation of an object (e.g., 3D modeling). Such surface hypotheses may be used to determine surface areas of interest (e.g., missing surfaces or surfaces with image quality below a threshold reliability criteria). Such surface areas of interest may be used to determine guidance regarding capturing one or more additional two-dimensional images, such as viewing locations that will provide needed in-fill of features to provide a full model at a target quality, for example. Such guidance (e.g., viewing locations and/or directions) may be provided to a user so that additional two-dimensional images may be captured and the augmented reality representation may be updated.

Processing may begin at operation 302, "DETERMINE AN AUGMENTED REALITY REPRESENTATION INCLUDING MULTIPLE SURFACE HYPOTHESES", where an augmented reality representation including a multiple number of surface hypotheses may be determined. For example, such an augmented reality representation of an object may be determined based at least in part on an analysis of one or more two-dimensional images of the object. Such an augmented reality representation may include multiple surface hypotheses. In some examples, "pose matching" (or the like) may be used to determine how two-dimensional images fit into an augmented reality representation (e.g., a 3D scene).

In some examples, the surface hypotheses may be computed employing a Random Sample Consensus Surface Extraction (RANSAC) algorithm, or the like, or combinations thereof. For example, RANSAC may take a point cloud and fit surface hypotheses to the point cloud. The overall approach can be described as generating a surface that minimizes the least squares difference from the surface to a point cloud while satisfying various assumptions. See, for example, Martin A. Fischler and Robert C. Bolles, "Random sample consensus: A paradigm for model fitting with applications to image analysis and automated cartography," Commun. ACM, 24(6): 381-395, 1981. The assumptions can include things like an expectation of planarity and linear features (common for architecture), and assumptions that recognized symmetry may continue into undetected areas when not precluded by the data. RANSAC may be amenable to a variety of inputs such as assumptions of symmetry or suggested geometry from possible image recognition hits. RANSAC (or other suitable general "error estimation" techniques) may be used in conjunction with lines in an image or edge conditions based on 3D extraction from multiple two-dimensional images or a video stream. For example, edges can be roughly extracted from video in the electronic image capturing device and then RANSAC may use tracked points to finalize shapes, textures, and/or locations of edges and planes.

In some examples, the augmented reality representation may have a group of surface hypotheses that do not yet have images of their surface or surfaces with poor image quality. Such surface hypotheses may be unobserved, but some type of geometry may be developed for the augmented reality representation based at least in part on knowledge of where such surfaces can't be (e.g., where such surfaces can't be or it would have been seen) and/or assumptions based on other elements of the augmented reality representation, such as symmetry or surface continuation, for example.

Processing may continue from operation 302 to operation 304, "DETERMINE ONE OR MORE RELIABILITY VALUES ASSOCIATED WITH INDIVIDUAL SURFACE HYPOTHESES", where one or more reliability values associated with individual surface hypotheses may be determined. For example, such reliability values may quantify a quality of surface hypotheses (e.g., in pixels per area units, or the like). In such an example, such reliability values may be determined based at least in part on the number of pixels available per area units (e.g., in square inches or the like) associated with an individual surface hypothesis. Such reliability values may be utilized to determine which surface hypotheses might not meet quality standards (e.g., because they were imaged at a high incident angle).

Processing may continue from operation 304 to operation 306, "IDENTIFY ONE OR MORE SURFACE AREAS OF INTEREST", where one or more surface areas of interest may be identified. For example, the one or more reliability values may be compared with one or more threshold reliability criteria to identify one or more surface areas of interest from the surface hypotheses. For example, such threshold reliability criteria may include one or more of the following criteria: a pixel per area threshold, an incomplete image data threshold, an absent image data threshold, images not matching at overlaps, image blur level, gamma correction (e.g., matching luminance or tristimulus values in video or still image systems), or the like, and/or combinations thereof. For example, a pixel per area-type reliability value associated with an individual surface hypothesis may be compared with a pixel per area-type threshold reliability criteria to determine if that individual surface hypothesis should be identified as a surface area of interest.

To evaluate quality of the surface hypotheses, an orthogonal transform may be performed to get an image (which need not be displayed, just in computation, for example) of what the surface looks like as seen from the perpendicular, then an image quality evaluation may be applied to this image. The quality evaluation may be tested against a metric to classify each surface as sufficient or not.

In some examples, the surface hypotheses of the augmented reality representation may include higher quality surface hypotheses that were extracted based on existing image data and lower quality polygon "holes" where there may be no existing image data. Such "holes" (e.g., where there is no existing image data) would fail any metric but zero automatically, and be identified as surface areas of interest.

Processing may continue from operation 306 to operation 308, "DETERMINE GUIDANCE REGARDING CAPTURING ONE OR MORE ADDITIONAL TWO-DIMENSIONAL IMAGES", where guidance regarding capturing one or more additional two-dimensional images may be determined. For example, guidance regarding capturing one or more additional two-dimensional images of the object may be displayed via a display of the electronic image capturing device. Such guidance may be based at least in part on the identified surface areas of interest, for example. Process 300 may utilize such additional two-dimensional images of the object to update the augmented reality representation.

As will be discussed in greater detail below with respect to FIG. 9, in some examples, such guidance may indicate one or more vantage points for capturing the one or more additional two-dimensional images of the object. Additionally or alternatively, such guidance may indicate the reliability values associated with individual surface hypotheses.

Some additional and/or alternative details related to process 300 may be illustrated in one or more examples of implementations discussed in greater detail below with regard to FIG. 4.

Figure 4:
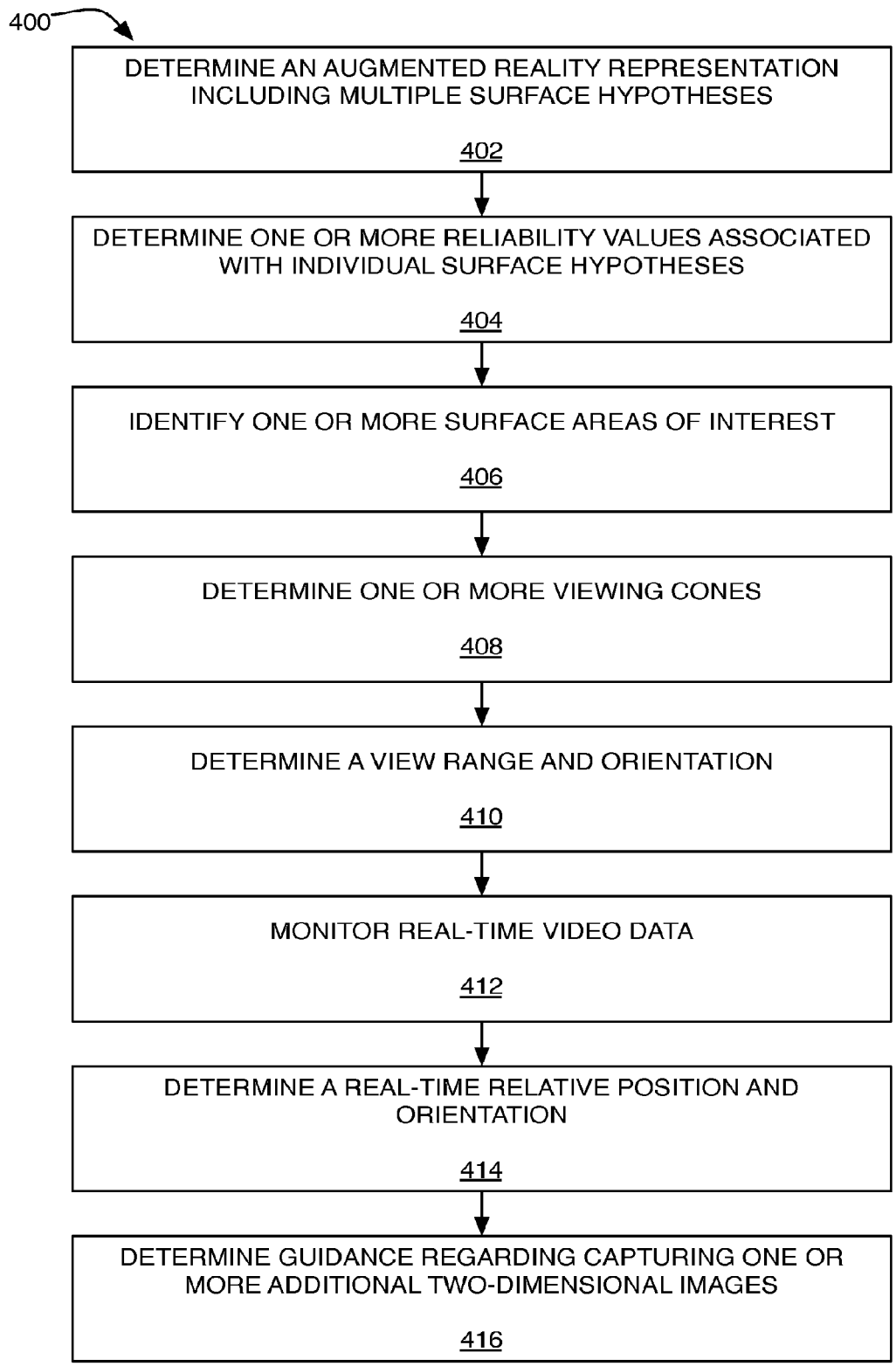
FIG. 4 illustrates another example process for capturing two-dimensional images for an augmented reality representation that is arranged in accordance with at least some embodiments of the present disclosure.

FIG. 4 illustrates another example process 400 for capturing two-dimensional images for an augmented reality representation that is arranged in accordance with at least some embodiments of the present disclosure. In the illustrated example, process 400 may include one or more of operations as illustrated by operations 402, 404, 406, 408, 410, 412, 414, and/or 416.

Processing may begin at operation 402, "DETERMINE AN AUGMENTED REALITY REPRESENTATION INCLUDING MULTIPLE SURFACE HYPOTHESES", where an augmented reality representation including a multiple number of surface hypotheses may be determined. For example, such an augmented reality representation of an object may be determined based at least in part on an analysis of one or more two-dimensional images of the object. Such an augmented reality representation may include multiple surface hypotheses.

Additionally or alternatively, prior to operation 402, one or more two-dimensional images of the object may be selected for determining the augmented reality representation of the object. For example a user may indicate an already taken image or may activate a camera mode to establish that the current viewport is framing something the user wishes to model.

Processing may continue from operation 402 to operation 404, "DETERMINE ONE OR MORE RELIABILITY VALUES ASSOCIATED WITH INDIVIDUAL SURFACE HYPOTHESES", where one or more reliability values associated with individual surface hypotheses may be determined.

Processing may continue from operation 404 to operation 406, "IDENTIFY ONE OR MORE SURFACE AREAS OF INTEREST", where one or more surface areas of interest may be identified. For example, the one or more reliability values may be compared with one or more threshold reliability criteria to identify one or more surface areas of interest from the multiple number of surface hypotheses.

Processing may continue from operation 406 to operation 408, "DETERMINE ONE OR MORE VIEWING CONES", where one or more viewing cones may be determined. For example, one or more viewing cones associated with individual surface areas of interest may be determined. As used herein, the term "viewing cone" may refer to a defined viewing area bounded by a defined viewing angle and centered by a surface normal vector.

For example, a surface normal vector and viewing angle (e.g., a viewing cone) can be developed from individual surface hypotheses. Such a viewing cone may provide a set of locations and view angles that can guide the user to occupy to observe surface areas of interest. In cases where the user reaches this location and view angle and does not observe the surface area of interest, an additional two-dimensional image may be captured, updating the augmented reality representation and the surface areas of interest. Alternatively, in cases where the user reaches this location and view angle and does not observe the surface area of interest, the user may select another location and view angle associated with another surface area of interest.

In some examples, small areas of low quality may generate excessive (e.g., dozens or thousands) surface areas of interest and the associated viewing cones. In such examples, viewing cones of such excessive surface areas of interest may be merged into a minimal intersection to choose one or a series of fewer additional two-dimensional images that can be used to provide some or all of the missing information. In some examples, the merging of the viewing cones into groups for establishing a few discrete two-dimensional images to take, may be implemented as a version of the programming Knapsack problem, solutions to which may include the Greedy algorithm, linear programming (e.g., linear programming may be appropriate in some cases due to geometric restrictions), or the like, and/or combinations thereof.

Additionally or alternatively, a filter may also be applied to require a minimum augmented reality representation impact before justifying capturing additional two-dimensional images. Such a filter may prevent tiny transition surfaces or surface glare from generating large numbers of surface areas of interest.

Processing may continue from operation 408 to operation 410, "DETERMINE A VIEW RANGE AND ORIENTATION", where a view range and orientation may be determined. For example, a view range and orientation associated with one or more of the viewing cones may be determined based at least in part on a quality level input.

In some examples, such a quality level input may have preset default settings and/or settings that may be adjusted based on user input. For example, a user may indicate an overall image quality desired (e.g., high-quality, medium-quality, or low-quality, or the like). Additionally or alternatively, in some examples, it may be possible to obtain the quality level input from another source (e.g., like a game or publication or program that may take a 3D model as an input) in order to allow such a source to require augmented reality representations of a certain quality. Additionally or alternatively, such quality level input may vary depending on the location of the associated individual surface hypotheses and/or the type of object being represented. For example, the object may be a vehicle (e.g., which may be independently recognized by the electronic image capturing device or may be indicated by user input). The data regarding the underside of such a vehicle-type object may not be needed at all, or may have a relatively lower associated quality level input as compared to other portions of the vehicle-type object. Accordingly, such quality level input may vary depending on the location of the associated individual surface hypotheses and/or the type of object being represented. In some examples, such quality level input may compared with or adjust the threshold reliability criteria.

Referring back to FIG. 2, for example, a view range 207 between electronic image capturing device 100 and object 200 may be determined that is at an optimal distance while also reaching a desired quality. Such a desired quality may be based at least in part on a pixel per area-based quality level input (e.g., such as pixels spread across area 210), for example. Such an optimal distance that also reaches a desired quality may be based at least in part on a lens angle 208 and resolution of electronic image capturing device 100. Such lens angle 208 may come from lens setting extents and/or a subtended angle of object 200 in frame. For example, view range 207 may be inversely proportional to the quality level input, inversely proportional to lens angle 208, and proportional to resolution of electronic image capturing device 100.

Referring back to FIG. 4, accordingly, such a determination of the view range and orientation may be influenced by the resolution of the electronic image capturing device, lens angle, and/or on the quality level input (e.g., the desired quality). If only a rough outline is desired, the resultant view range and/or orientation may be different as the view range and orientation angles may work out much larger, as the pixel density need not be as great (and there may be more overlaps of view cones—potentially requiring fewer images). For example, such a resultant view range and/or orientation may be based at least in part on a comparison of the quality level input to the size of a pixel at particular distance and/or lens setting. Accordingly, adjusting the view range and orientation associated with one or more of the viewing cones based at least in part on a quality level input and/or on resolution may increase or decrease the number of projected additional two-dimensional images (e.g., to achieve the fewest number of projected additional two-dimensional images needed).

Processing may continue from operation 410 to operation 412, "MONITOR REAL-TIME VIDEO DATA", where real-time video data may be monitored. For example, real-time video data may be monitored by the electronic image capturing device in order to track the relative position and orientation between the electronic image capturing device and the object.

Processing may continue from operation 412 to operation 414, "DETERMINE A REAL-TIME RELATIVE POSITION AND ORIENTATION", where a real-time relative position and orientation may be determined. For example, a real-time relative position and orientation between the electronic image capturing device and the object may be determined based at least in part on the real-time video data. For example, the real-time video data may be compared with a current augmented reality representation to confirm that the object is currently being monitored and/or to determine the relative position and orientation between the electronic image capturing device and the object. For example, the real-time video data may be compared with a current augmented reality representation via "pose matching" (or the like); where such pose matching may be used to determine how two-dimensional images compare to an augmented reality representation (e.g., a 3D scene). See, for example, Lingyun Liu., Stamos I., A systematic approach for 2D-image to 3D-range registration in urban environments. IEEE ICCV, 1-8, 2007.

Processing may continue from operation 414 to operation 416, "DETERMINE GUIDANCE REGARDING CAPTURING ONE OR MORE ADDITIONAL TWO-DIMENSIONAL IMAGES", where guidance regarding capturing one or more additional two-dimensional images may be determined. For example, guidance regarding capturing one or more additional two-dimensional images of the object may be displayed via a display of the electronic image capturing device. Such guidance may be based at least in part on the identified surface areas of interest, for example. In some examples, the guidance may be based at least in part on the view range and orientation associated with one or more of the viewing cones.

In some examples, such guidance may include the user being shown the view cones associated with individual surface areas of interest and asked to fill the view cones in. In some examples, such guidance may include the user being shown a set of locations and view angles that can guide the user to occupy to observe surface areas of interest (e.g., based at least in part on a corresponding viewing cone). In such an example, there might be a large number of overlapping possible viewing cones, (e.g., see FIG. 8), and a particular guided location and view angle may be determined as being most beneficial (e.g., as perhaps that particular guided location and view angle is within several view cones). Additionally or alternatively, such guidance may include the user being shown some sort of overlay indicating the reliability values (or an indication of a comparison of the reliability values of with the threshold reliability criteria) associated with individual surface areas of interest or the reliability values associated with individual view cones (e.g., each potential photography location) so that they the user may decide where to take additional two-dimensional images to fill in the augmented reality representation.

This guidance may then evolve with each two-dimensional image taken, as the images associated with particular surface areas of interest or particular view cones are recognized as having been captured. In such an example, such guidance may then evolve with each two-dimensional image taken, as the augmented reality representation may be updated upon capturing additional two-dimensional images so that such particular surface areas of interest or particular view cones may be removed from indication when a corresponding two-dimensional image is captured. Additionally or alternatively, such guidance may evolve based at least in part on images captured from real-time video data captured by the electronic image capturing device.

In some examples, such guidance may only display a top one, two, or three view cones, which might be updated upon capturing an image from one of such view cones. Additionally or alternatively, such guidance may then evolve with each two-dimensional image taken, as the augmented reality representation may be updated upon capturing additional two-dimensional images, which may result in a new set of surface areas of interest and/or view cones.

As will be discussed in greater detail below with respect to FIG. 9, in some examples, the guidance may be based at least in part on the view range and orientation associated with one or more of the viewing cones, as discussed above with respect to operations 408 and 410. Additionally or alternatively, the guidance may be based at least in part on the determined real-time relative position and orientation between the electronic image capturing device and the object, as discussed above with respect to operations 412 and 414.

Referring back to FIG. 1, as described with reference to processes 300 and/or 400 of FIGS. 3 and 4, an augmented reality representation may include a multiple number of surface hypotheses. One or more reliability values may be associated with individual surface hypotheses, which may be determined by control unit 104. The one or more reliability values may be compared with one or more threshold reliability criteria to identify one or more surface areas of interest from the multiple number of surface hypotheses. Guidance regarding capturing one or more additional two-dimensional images of the object may be provided to a user, such as by visual guidance delivered via display 106. Such guidance may be determined based at least in part on the identified surface areas of interest. For example, such guidance may prompt a user to capture one or more additional two-dimensional images of the object so as to obtain additional data regarding the identified surface areas of interest.

Figure 5:
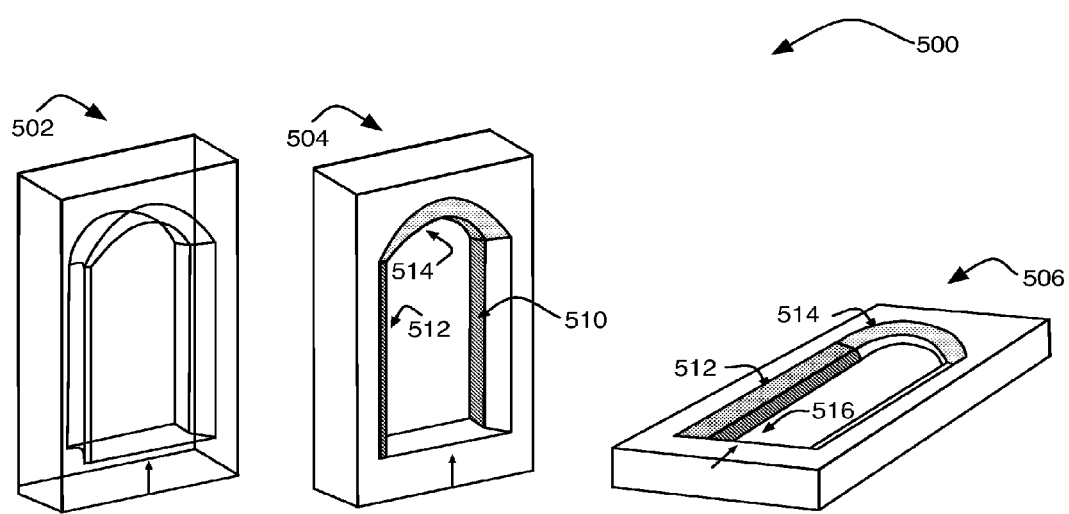
FIG. 5 illustrates an example augmented reality representation including a multiple number of surface hypotheses that is arranged in accordance with at least some embodiments of the present disclosure.

FIG. 5 illustrates an example augmented reality representation 500 including a multiple number of surface hypotheses that is arranged in accordance with at least some embodiments of the present disclosure. In the illustrated example, augmented reality representation 500 is illustrated by a first view 502, a second view 504, and a third view 506.

A number of different approaches may be employed to determine desired locations to capture one or more additional two-dimensional images in order to cover surface areas of interest (e.g., unobserved surfaces or low quality surfaces). This may be done based on information from observed surfaces. For example, RANSAC is the abbreviation for "Random Sample Consensus", which may be used for taking a point cloud and fitting surface hypotheses to the point cloud. The overall approach may be described as generating a surface that minimizes the least squares difference from the surface to a point cloud while satisfying various assumptions. The assumptions may include an expectation of planarity and linear features (common for architecture), recognition of symmetry (as in FIG. 5), and comparable ones, which are likely to continue into unobserved areas when not precluded by the data. In order to determine desired locations to capture one or more additional two-dimensional images, surfaces that are in some way deficient may be identified such that more data on those surfaces can be collected.

The three dimensional figures in augmented reality representation 500 illustrate varying reliability values associated with individual surface hypothesis by varying the presentation of the individual surface hypothesis. According to an example scenario, such reliability values may be computed as the sum of the area proportion with point density below average and the ratio of the surface mean error to the surface mean error on surfaces closest to normal with the measured view. Thus, both the quality of the points and the proportion of the surface that has not been observed may be used in determining such reliability values.

For example, an augmented reality representation 500 generated based on a two-dimensional images similar to first view 502 may have a relatively high reliability value associated with surface 510, a relatively low reliability value associated with surface 512 and 516, and a relatively intermediate reliability value associated with surface 514. For example, surface 510 is easily seen from first view 502, while surface 512 can only be partially viewed or viewed from an extreme angle and surface 516 can only be predicted as it is not directly viewable, limiting the quality of data associated with surface 512 and surface 516.

Views 502, 504, and 506 of augmented reality representation 500 may be obtained as an output of a RANSAC surface extractor program. In views 502, 504, and 506, surfaces of the same architectural structure are hypothesized (referred to herein as surface hypothesis) and the structure is shown in various rotated positions to illustrate surface areas of interest (e.g., hypothesized but unobserved surfaces where surface image data has not been taken or low quality surfaces).

In addition to computing a suitable geometry, a reliability value may be generated for individual surface hypothesis segments (shown in different shades of grey). Instead of only using a least squares matching for confidence (which can actually be quite high for a presumed surface with few points), an appropriate reliability value (e.g., based on image pixels per area) may be used. In such an example, both the quality of the points (which is low here for the surface 512, even though it has been directly observed) and the proportion of the surface that has not been observed (which is high for surface 514 and surface 516) may be evaluated.

In the illustrated example, reliability values may be illustrated by varying shades of grey for individual surface hypothesis segments. A relatively high reliability value associated with surface 510 may be illustrated with a light shade of grey, a relatively low reliability value associated with surface 512 and 516 might be illustrated with a dark shades of grey, and a relatively intermediate reliability value associated with surface 514 might be illustrated with an intermediate shade of grey. In some embodiments, such reliability values may be illustrated by varying shades of color (e.g., red, orange, yellow, and green). Additionally or alternatively, such reliability values may be illustrated by numerical or percentage values representing the reliability value appearing on or near the associated surface hypothesis segments or associated with an indicated cone or photo viewpoint.

Figure 6:
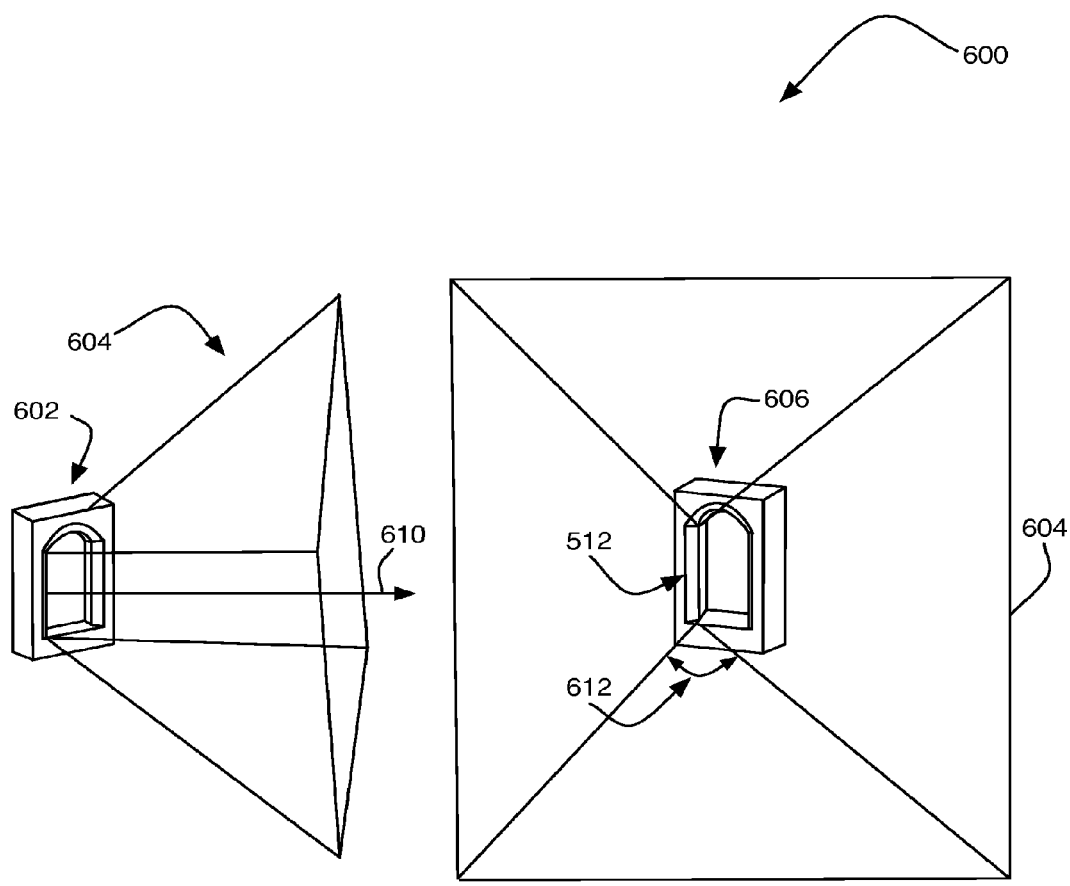
FIG. 6 illustrates an example viewing cone associated with an augmented reality representation that is arranged in accordance with at least some embodiments of the present disclosure.

FIG. 6 illustrates an example viewing cone associated with an augmented reality representation that is arranged in accordance with at least some embodiments of the present disclosure. In the illustrated example, augmented reality representation 600 is illustrated by a first view 602 and a second view 606. View cone 604 associated with the low quality surface 512, is shown in a broad view associated with first view 602 and is shown in an end view (e.g., a view centered by a surface normal vector with respect to surface 512) associated with second view 606. A single view cone 604 is illustrated here for clarity. In this case, view cone 604 may be a draft extension grown from a surface normal vector 610 from the existing surface 512 with a defined view angle 612. Such a defined view angle 612 may be calculated based at least in part on resolution and/or distance so as to yield a desired surface quality or resolution. Views, which might capture better data for surface areas of interest (e.g., surface 512) in order to complete an augmented reality representation for the object, may be determined based at least in part on defined viewing angle 612 and surface normal vector 610 computed from such surface areas of interest.

Figure 7:
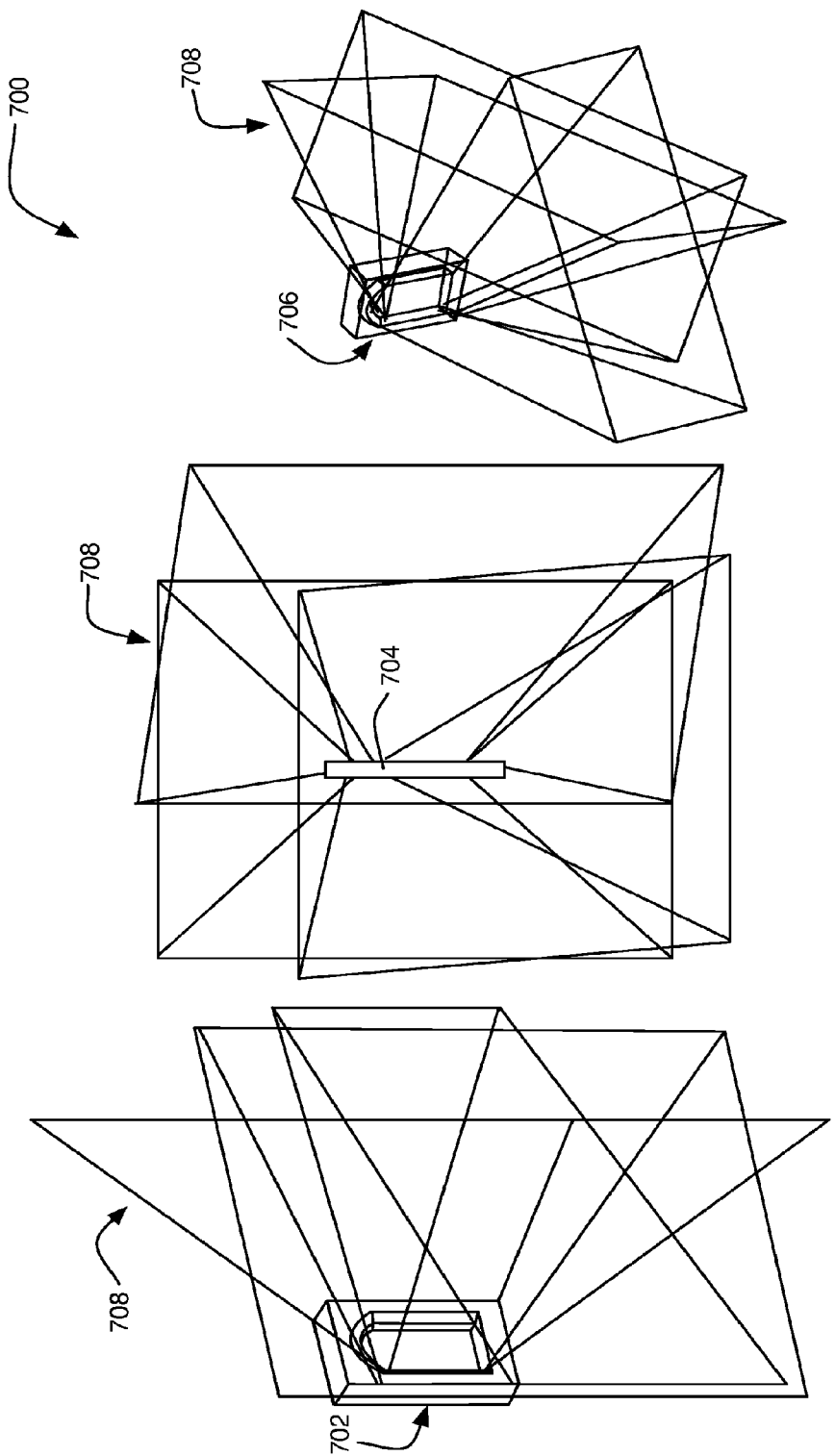
FIG. 7 illustrates example viewing cones associated with surface areas of interest from the multiple number of surface hypotheses that are arranged in accordance with at least some embodiments of the present disclosure.

FIG. 7 illustrates example viewing cones associated with surface areas of interest from the multiple number of surface hypotheses that are arranged in accordance with at least some embodiments of the present disclosure. In the illustrated example, augmented reality representation 700 is illustrated by a first view 702, a second view 704, and a third view 706. A multiple number of view cones 708 may be associated with surface areas of interest (e.g., unobserved and low quality surfaces (512, 514, 516—of FIG. 5, for example).

Individual views cones 708 may be drawn using the surface normal vector associated with each surface area of interest (e.g., unobserved and low quality surfaces (512, 514, 516—of FIG. 5, for example). For non-planar surfaces this may be done by breaking down the surfaces that were previously identified as low quality from a single score (above) into a Voronoi tessellation (or the like) and giving each region a similar score and then using the largest area in the Voronoi diagram with a score below the threshold as the surface for normal generation, for example (e.g., generation of the cone from the left half of surface 514 in FIG. 5). The segments of the Voronoi diagram may be the points in the plane that are equidistant to the two nearest sites. Then, each surface normal vector may be extended and the corresponding view cone 702 defined based on the imaging metrics discussed above.

Figure 8:
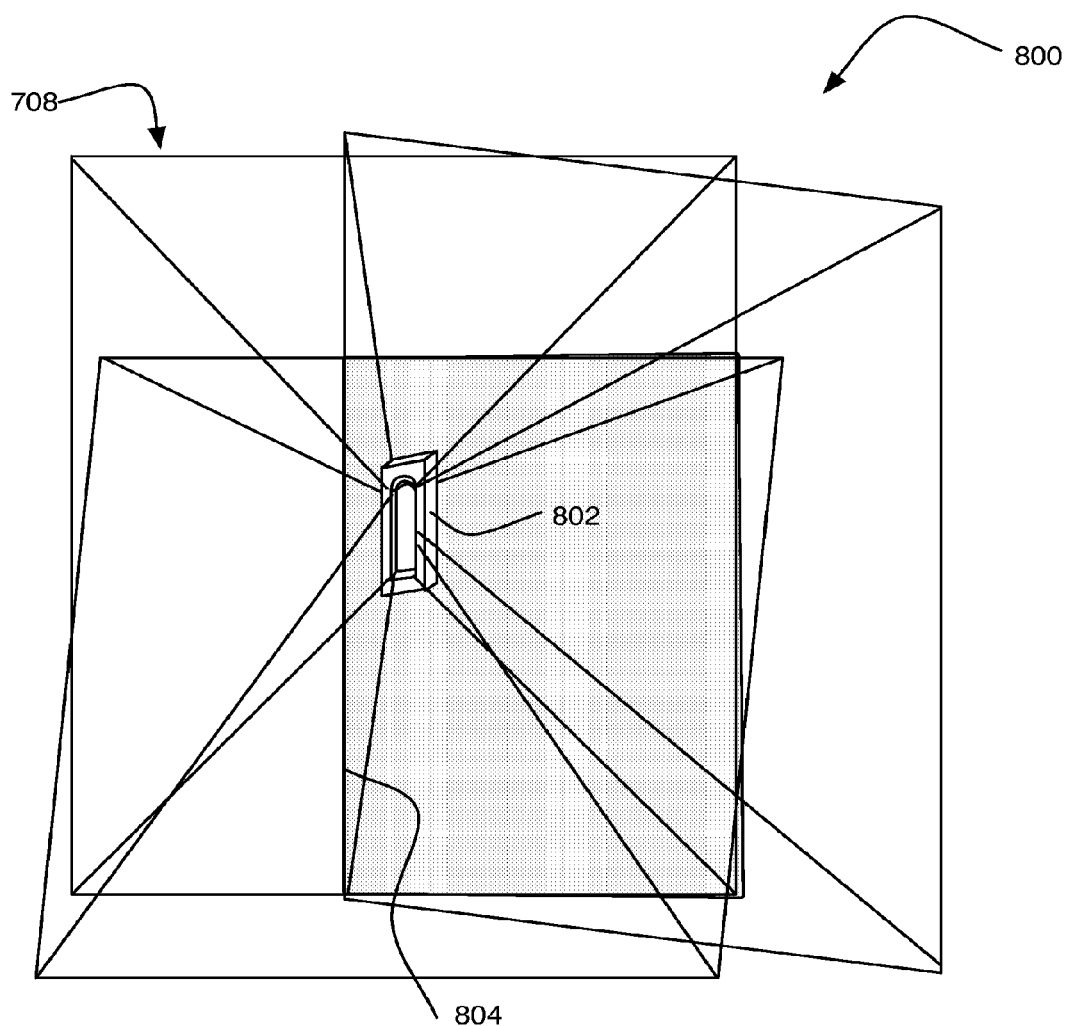
FIG. 8 illustrates an example selection for obtaining data on surface areas of interest based on the viewing cones that is arranged in accordance with at least some embodiments of the present disclosure.

FIG. 8 illustrates an example selection for obtaining data on surface areas of interest based on the viewing cones that is arranged in accordance with at least some embodiments of the present disclosure. In the illustrated example, augmented reality representation 800 is illustrated by a first view 802. A multiple number of view cones 708 may be associated with surface areas of interest (e.g., unobserved and low quality surfaces (512, 514, 516—of FIG. 5, for example).

Some or all of the multiple number of view cones 708 may overlap at an intersection 804. The selection of desired locations for capturing images may be based at least in part on finding locations that generate as much data on as many surface areas of interest as possible (e.g., such as via an intersection 804). In algorithmic terms, if filling in one of view cones 708 is allotted as having a certain "score" then each available view cone 708 may have an overall compound score that may represent how much data that view cone 708 contributes to the augmented reality representation. The possible locations may also have other limitation on them such as height of the photographer and exclusion of taking two-dimensional images from inside other objects. Taking the highest scoring locations into mind may result in filling in the augmented reality representation with the least images, such as where some or all of the multiple number of view cones 708 may overlap at intersection 804, for example.

Figure 9:
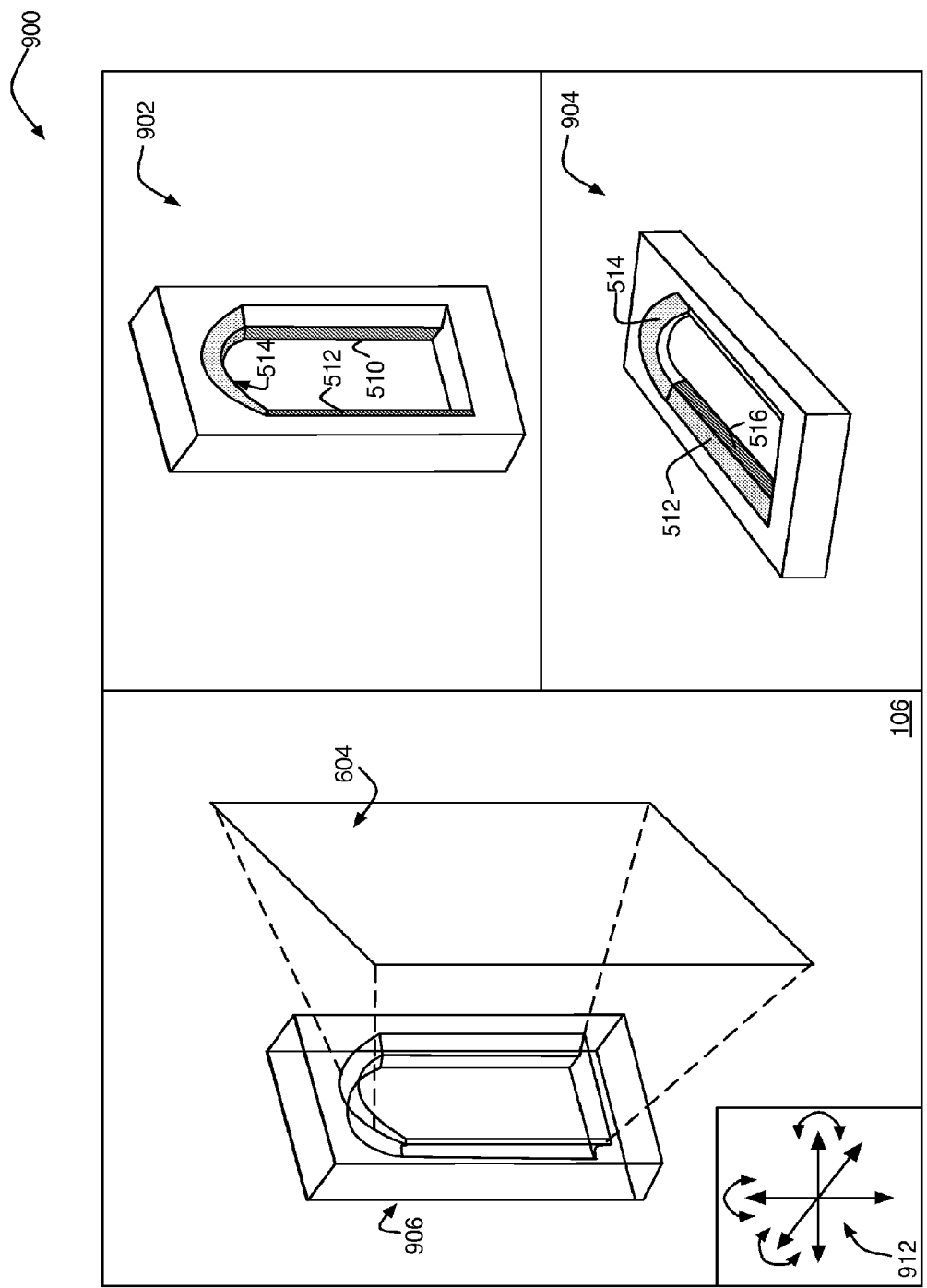
FIG. 9 illustrates an example screen shot that is arranged in accordance with at least some embodiments of the present disclosure.

FIG. 9 illustrates an example screen shot that is arranged in accordance with at least some embodiments of the present disclosure. As discussed above, in some examples, such guidance may indicate one or more vantage points for capturing the one or more additional two-dimensional images of the object. Additionally or alternatively, such guidance may indicate the reliability values associated with individual surface hypotheses.

As discussed above (with respect to FIG. 5), a reliability value may be generated for individual surface hypothesis segments (shown in different shades of grey). In the illustrated example, reliability values may be illustrated by varying shades of grey for individual surface hypothesis segments. A relatively low reliability value associated with surface 512 and 516 might be illustrated with a dark shades of grey, and a relatively intermediate reliability value associated with surface 514 might be illustrated with an intermediate shade of grey. In some embodiments, such reliability values may be illustrated by varying shades of color (e.g., red, orange, yellow, and green). In such an example, the color red might be associated with an unobserved surface 516, the color orange might illustrate a relatively low reliability value associated with surface 512, the color yellow might illustrate a relatively intermediate reliability value associated with surface 514, and the color green might illustrate a relatively high reliability value. Additionally or alternatively, such reliability values may be illustrated by numerical or percentage values representing the reliability value appearing on or near the associated surface hypothesis segments.

In some examples, such guidance may include a display of a current augmented reality representation 902. Such a current augmented reality representation 902 may include illustrated reliability values associated with surfaces 510, 512, and/or 514, for example. Current augmented reality representation 902 may be rotated by user interaction with the electronic image capturing device (e.g., via touch screen or the like), so that a user might see visually from which angles individual surface areas of interest (e.g., surfaces 512 and/or 514) might best be viewed.

Additionally or alternatively, in some examples, such guidance may include a display of current augmented reality representation 904 that may be oriented to represent a suggested vantage point to capture one or more additional two-dimensional images. In the illustrated example, current augmented reality representation 904 may be oriented so that individual surface areas of interest (e.g., surfaces 512, 514, and/or 516) might best be viewed.

Additionally or alternatively, in some examples, such guidance may include a display of object 906 (e.g., a live display). View cone 604 may be superimposed on object 906 to represent a suggested vantage point to capture one or more additional two-dimensional images. Additionally or alternatively, other visual guidance may include the user being shown a location and view angle that can guide the user to occupy to observe surface areas of interest (e.g., based at least in part on a corresponding viewing cone). In such examples, the guidance may be based at least in part on the determined real-time relative position and orientation between the electronic image capturing device and the object. For example, the electronic image capturing device may instruct a user to keep the electronic image capturing device focused on the object as the user changes location, so that the display of object 906 and view cone 604 may be dynamically altered as relative position and orientation between the electronic image capturing device and the object changes.

Additionally or alternatively, view cone 604 may be superimposed on current augmented reality representation 902 and/or 904 to represent a suggested vantage point to capture one or more additional two-dimensional images. In some examples, a multiple number of view cones 604 may be presented. In such an example, a visual indication may be given when an image is captured that satisfies each of the multiple number of view cones 604.

In some examples, the user can be guided to satisfy each two-dimensional image by showing arrows 912 indicating to shift or rotate the electronic image capturing device, hold it higher or lower, or to approach or move away from the object. The desired distance from an object may be a trade off between a wider view and higher resolution, and distance may be calculated by comparing the required metric (e.g., in pixels per linear distance) to the electronic image capturing device resolution and the angle of view to surfaces in the frame. Such a resolution metric may set a maximum distance while minimum distance influences range of view and thus how many images may need to be acquired. In such an example, the guidance may be based at least in part on the determined real-time relative position and orientation between the electronic image capturing device and the object. For example, the electronic image capturing device may instruct a user to keep the electronic image capturing device focused on the object as the user changes location, so that the display of arrows 912 (indicating to shift or rotate the electronic image capturing device, hold it higher or lower, or to approach or move away from the object) may be dynamically altered as relative position and orientation between the electronic image capturing device and the object changes.

In operation, display 106 may be utilized to provide a dynamic feedback that may give the user better results and less frustration. Additionally or alternatively, real-time updating of the augmented reality representations (e.g., 3D models) within the electronic image capturing device 100 (FIG. 1), may allow augmented reality representations to be viewed or shared immediately after generation, and/or permit an iterative approach to improving an augmented reality representation as each additional two-dimensional image is captured.

In operation, providing real-time user feedback to help a user generate an augmented reality representation using two-dimensional images may reduce user result frustration and a may allow for a higher level of quality from "crowd-sourced" 3D objects. Such augmented reality representations may be used with electronic games, where users might create augmented reality representations of gear, places, or people and use them in a game; general photography, where users might generate 3D location and feature imagery for sharing with friends; and/or documentation, where users may record positions after a car accident or to record a location for annotation or later comparison to "before."

FIG. 10 illustrates an example computer program product 1000 that is arranged in accordance with at least some examples of the present disclosure. Program product 1000 may include a signal bearing medium 1002. Signal bearing medium 1002 may include one or more machine-readable instructions 1004, which, if executed by one or more processors, may operatively enable a computing device to provide the functionality described above with respect to FIG. 3 and/or FIG. 4. Thus, for example, referring to the system of FIG. 1, electronic image capturing device 100 may undertake one or more of the actions shown in FIG. 3 and/or FIG. 4 in response to instructions 1004 conveyed by medium 1002.

In some implementations, signal bearing medium 1002 may encompass a non-transitory computer-readable medium 1006, such as, but not limited to, a hard disk drive, a Compact Disc (CD), a Digital Versatile Disk (DVD), a digital tape, memory, etc. In some implementations, signal bearing medium 1002 may encompass a recordable medium 1008, such as, but not limited to, memory, read/write (R/W) CDs, R/W DVDs, etc. In some implementations, signal bearing medium 1002 may encompass communications medium 1010, such as, but not limited to, a digital and/or an analog communication medium (e.g., a fiber optic cable, a waveguide, a wired communications link, a wireless communication link, etc.).

Figure 11:
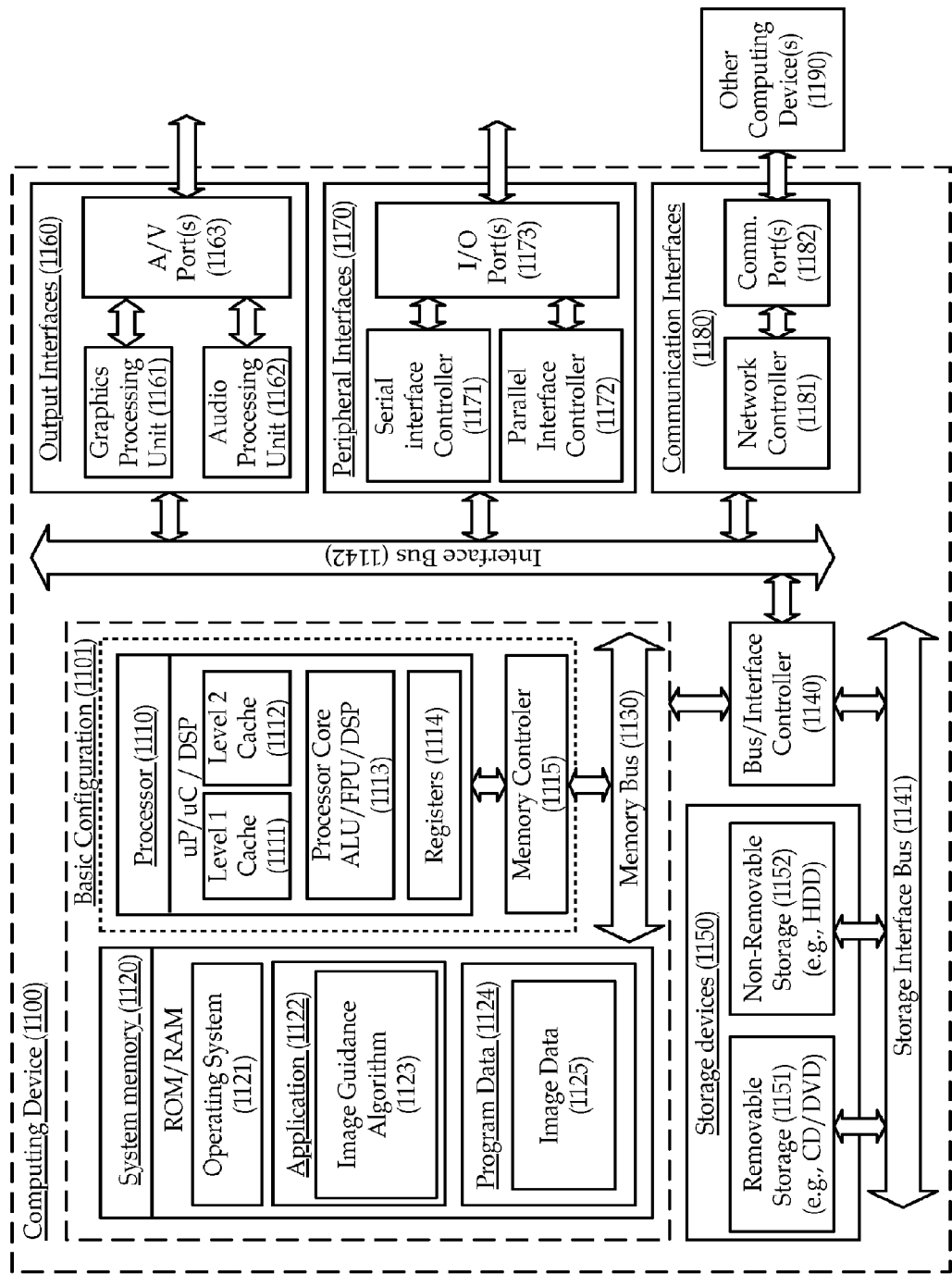
FIG. 11 is a block diagram of an illustrative embodiment of a computing device arranged in accordance with at least some embodiments of the present disclosure.

FIG. 11 is a block diagram illustrating an example computing device 1100, such as might be embodied by a person skilled in the art, which is arranged in accordance with at least some embodiments of the present disclosure. In one example configuration 1101, computing device 1100 may include one or more processors 1110 and system memory 1120. A memory bus 1130 may be used for communicating between the processor 1110 and the system memory 1120.

Depending on the desired configuration, processor 1110 may be of any type including but not limited to a microprocessor (μP), a microcontroller (μC), a digital signal processor (DSP), or any combination thereof. Processor 1110 may include one or more levels of caching, such as a level one cache 1111 and a level two cache 1112, a processor core 1113, and registers 1114. The processor core 1113 may include an arithmetic logic unit (ALU), a floating point unit (FPU), a digital signal processing core (DSP Core), or any combination thereof. A memory controller 1115 may also be used with the processor 1110, or in some implementations the memory controller 1115 may be an internal part of the processor 1110.

Depending on the desired configuration, the system memory 1120 may be of any type including but not limited to volatile memory (such as RAM), non-volatile memory (such as ROM, flash memory, etc.) or any combination thereof. System memory 1120 may include an operating system 1121, one or more applications 1122, and program data 1124. Application 1122 may include an image guidance algorithm 1123 that is arranged to perform the functions as described herein including the functional blocks and/or actions described with respect to process 300 of FIG. 3 and/or process 400 of FIG. 4. Program Data 1124 may include image data 1125 for use with image guidance algorithm 1123. In some example embodiments, application 1122 may be arranged to operate with program data 1124 on an operating system 1121 such that implementations of providing guidance to capture two-dimensional images for an augmented reality representation may be provided as described herein. For example, electronic image capturing device 100 (see, e.g., FIG. 1) may comprise all or a portion of computing device 1100 and be capable of performing all or a portion of application 1122 such that implementations of providing guidance to capture two-dimensional images for an augmented reality representation may be provided as described herein. This described basic configuration is illustrated in FIG. 11 by those components within dashed line 1101.

Computing device 1100 may have additional features or functionality, and additional interfaces to facilitate communications between the basic configuration 1101 and any required devices and interfaces. For example, a bus/interface controller 1140 may be used to facilitate communications between the basic configuration 1101 and one or more data storage devices 1150 via a storage interface bus 1141. The data storage devices 1150 may be removable storage devices 1151, non-removable storage devices 1152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1120, removable storage 1151 and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1100. Any such computer storage media may be part of device 1100.

Computing device 1100 may also include an interface bus 1142 for facilitating communication from various interface devices (e.g., output interfaces, peripheral interfaces, and communication interfaces) to the basic configuration 1101 via the bus/interface controller 1140. Example output interfaces 1160 may include a graphics processing unit 1161 and an audio processing unit 1162, which may be configured to communicate to various external devices such as a display or speakers via one or more NV ports 1163. Example peripheral interfaces 1170 may include a serial interface controller 1171 or a parallel interface controller 1172, which may be configured to communicate with external devices such as input devices (e.g., keyboard, mouse, pen, voice input device, touch input device, etc.) or other peripheral devices (e.g., printer, scanner, etc.) via one or more I/O ports 1173. An example communication interface 1180 includes a network controller 1181, which may be arranged to facilitate communications with one or more other computing devices 1190 over a network communication via one or more communication ports 1182. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 1100 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 1100 may also be implemented as a personal computer including both laptop computer and non-laptop computer configurations. In addition, computing device 1100 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method, comprising:
   determining, by an electronic image capturing device, an augmented reality representation of an object based at least in part on an analysis of one or more two-dimensional images of the object, wherein the augmented reality representation includes a plurality of surface hypotheses;
   determining one or more reliability values associated with individual surface hypotheses;
   comparing the one or more reliability values with one or more threshold reliability criteria to identify one or more surface areas of interest from the plurality of surface hypotheses; and
   displaying guidance regarding capturing one or more additional two-dimensional images of the object via a display of the electronic image capturing device, wherein the guidance is based at least in part on the identified surface areas of interest;
   wherein the guidance indicates the one or more reliability values associated with individual surface hypotheses of the one or more surface hypotheses and wherein the one or more reliability values are calculated for the individual surface hypotheses based on an area proportion comprising a point density below an average point density and a surface mean error.

2. The method of claim 1, further comprising:
   determining one or more viewing cones associated with individual surface areas of interest; and
   determining a view range and orientation associated with one or more of the viewing cones based at least in part on a quality level input,
   wherein the guidance is based at least in part on the view range and orientation associated with one or more of the viewing cones.

3. The method of claim 2, wherein the one or more viewing cones individually comprise a defined viewing area bounded by a defined viewing angle and centered by a surface normal vector.

4. The method of claim 1, further comprising:
   monitoring real-time video data; and
   determining a real-time relative position and orientation between the electronic image capturing device and the object based at least in part on the real-time video data, wherein the guidance is based at least in part on the determined real-time relative position and orientation between the electronic image capturing device and the object.

5. The method of claim 1, wherein the augmented reality representation comprises a three-dimensional image of the object.

6. The method of claim 1, wherein the plurality of surface hypotheses are computed employing a Random Sample Consensus Surface Extraction (RANSAC) algorithm.

7. The method of claim 1, wherein the one or more threshold reliability criteria comprise one or more of the following criteria: a pixel per area threshold, an incomplete image data threshold, and/or an absent image data threshold.

8. The method of claim 1, wherein the guidance indicates one or more vantage points for capturing the one or more additional two-dimensional images of the object.

9. The method of claim 1, further comprising receiving an indication from a user that one or more two-dimensional images of the object have been selected, wherein the determining, by an electronic image capturing device, of the augmented reality representation of the object is based at least in part on the indication from the user.

10. An electronic image capturing device, comprising:
an optical sensor configured to capture two-dimensional images of an object and capture real-time video data; and
a control unit configured to:
determine an augmented reality representation of the object based at least in part on an analysis of one or more two-dimensional images of the object, wherein the augmented reality representation includes a plurality of surface hypotheses;
determine one or more reliability values associated with individual surface hypotheses;
compare of the one or more reliability values with one or more threshold reliability criteria to identify one or more surface areas of interest from the plurality of surface hypotheses; and
determine guidance regarding capturing one or more additional two-dimensional images of the object via a display of the electronic image capturing device, wherein the guidance is based at least in part on the identified surface areas of interest;
wherein the guidance indicates the one or more reliability values associated with individual surface hypotheses of the one or more surface hypotheses and wherein the one or more reliability values are calculated for the individual surface hypotheses based on an area proportion comprising a point density below an average point density and a surface mean error.

11. The electronic image capturing device of claim 10, wherein the control unit is further configured to:
determine one or more viewing cones associated with individual surface areas of interest; and
determine a view range and orientation associated with one or more of the viewing cones based at least in part on a quality level input, wherein the guidance is based at least in part on the view range and orientation associated with one or more of the viewing cones.

12. The electronic image capturing device of claim 11, wherein the one or more viewing cones individually comprise a defined viewing area bounded by a defined viewing angle and centered by a surface normal vector.

13. The electronic image capturing device of claim 10, wherein the control unit is further configured to:
monitor real-time video data; and
determine a real-time relative position and orientation between the electronic image capturing device and the object based at least in part on the real-time video data, wherein the guidance is based at least in part on the determined real-time relative position and orientation between the electronic image capturing device and the object.

14. The electronic image capturing device of claim 10, wherein the augmented reality representation comprises a three-dimensional image of the object, wherein the guidance regarding capturing the one or more additional two-dimensional images is configured to direct a user to capture the one or more two-dimensional images from a particular perspective wherein the one or more two-dimensional images are identified to supplement data associated with the plurality of surface hypotheses to increase the one or more reliability values.

15. The electronic image capturing device of claim 10, wherein the plurality of surface hypotheses are computed employing a Random Sample Consensus Surface Extraction (RANSAC) algorithm.

16. The electronic image capturing device of claim 10, wherein the one or more threshold reliability criteria comprise one or more of the following criteria: a pixel per area threshold, an incomplete image data threshold, and/or an absent image data threshold.

17. The electronic image capturing device of claim 10, wherein the guidance indicates one or more vantage points for capturing the one or more additional two-dimensional images of the object.

18. The electronic image capturing device of claim 10, wherein the guidance indicates the reliability values associated with individual surface hypotheses.

19. The electronic image capturing device of claim 10, wherein the electronic image capturing device comprises a digital camera, a cell phone, a personal data assistant, a mobile computing pad, a personal media player device, or a wireless web-watch device.

20. An article comprising:
a non-transitory computer readable medium comprising machine-readable instructions stored thereon, which, if executed by one or more processors, operatively enable a computing device to:
determine an augmented reality representation of an object based at least in part on an analysis of one or more two-dimensional images of the object, wherein the augmented reality representation includes a plurality of surface hypotheses;
determine one or more reliability values associated with individual surface hypotheses wherein the reliability values are based at least in part on the number of pixels available per area units;
compare of the one or more reliability values with one or more threshold reliability criteria to identify one or more surface areas of interest from the plurality of surface hypotheses; and
determine guidance regarding capturing one or more additional two-dimensional images of the object via a display of the electronic image capturing device, wherein the guidance is based at least in part on the identified surface areas of interest, wherein the additional two-dimensional image is identified to supplement data associated with the plurality of surface hypotheses to increase the one or more reliability values.

* * * * *